April 25, 1939.  S. I. WILBUR  2,155,574
CLOSURE
Filed May 29, 1936
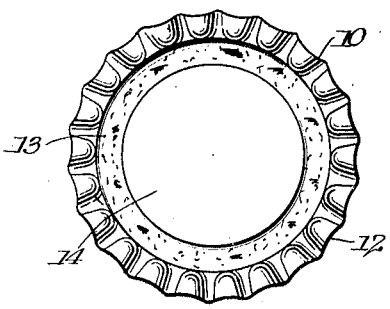
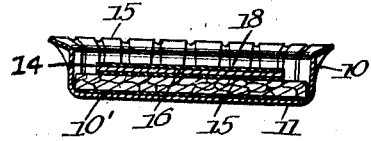
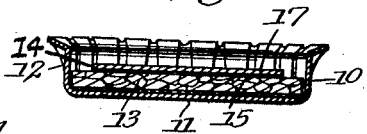
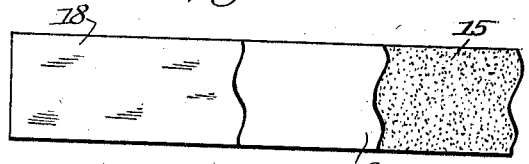
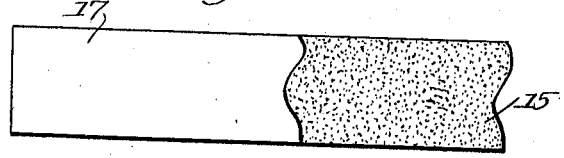
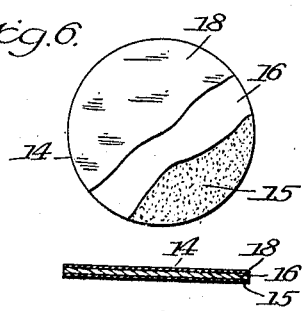
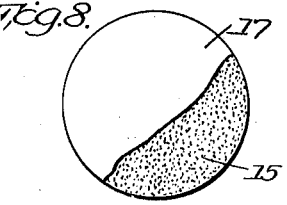
Inventor
Scott Ira Wilbur
By
Attorneys Patented Apr. 25, 1939

2,155,574

UNITED STATES PATENT OFFICE 2,155,574

CLOSURE

Scott Ira Wilbur, Baltimore, Md., assignor to Crown Cork & Seal Company, Inc., Baltimore, Md., a corporation of New York Application May 29, 1936, Serial No. 82,635

1 Claim. (Cl. 215—38)

This invention relates to container closures and more particularly to closure caps for bottles and the like which include a metallic shell having a crimped skirt, a cushion liner of cork or cork composition affixed thereto, and a center spot facing of paper or metal foil bonded to the liner by a stratum of liquid-resistant and thermoplastic adhesive. The center spot is ordinarily of smaller diameter than the cushion liner to cover up the central portion thereof and leave exposed an annular marginal portion which cooperates with the lip of the bottle neck to provide a tight seal. The purpose of the center spot is to prevent the contents of the bottle coming in contact with the cushion disc.

The present invention constitutes an improvement on the embodiment shown in Patent No. 1,956,481, Warth, granted April 24, 1934, which patent discloses a cap of the center spot type, above described, the center spot being bonded to the cushion liner by a liquid-resistant and thermoplastic adhesive. While the caps produced in accordance with the disclosure of that patent have been satisfactory, the herein described improvements have made possible the production of superior closures at less cost and with greater speed.

The principal difficulty encountered in the efficient production of closures of the center spot type is in the provision of an adhesive which will be thermoplastic and liquid-resistant, and which will cause the spot or other facing material to adhere with great tenacity to the cushion liner. Such an adhesive must be one which is plastic and non-tacky at ordinary temperatures, and which when heated to a high temperature, becomes very tacky. The adhesive properties are greatly enhanced if the composition is capable of forming an extremely thin film, since the thinner the film, the better the adhesion between the two surfaces which are stuck together. For the efficient production of caps, it is desirable that the adhesive be one which can be applied to the spot of facing material in the form of a solution and which will dry at normal temperatures in a very short time. The adhesive material must also be non-oxidizable and therefore unaffected by exposure to air or such gases as may be produced in a sealed container. Moreover, the adhesive material must be non-drying, in order that the caps may be stored for a long period of time without contracting, or becoming brittle.

The adhesive material, employed in the closures which are the subject of the present invention, possesses the above mentioned desired qualities, is fusible at a relatively low temperature, water-insoluble and acid-resistant, gas-resistant, and forms a thin continuous elastic and resilient coating or layer between the facing material and the cushion liner. While this material is particularly adapted for uniting cork or cork composition with metallic foils such as aluminum or tin, or paper materials which may or may not be coated with impervious substances such as varnish, it may also be used with many other materials and for many other purposes where an adhesive is required.

The cap of the present invention is an improvement over those which have hitherto been used, in that by reason of the above mentioned characteristics of the adhesive, the facing is held securely to the cushion liner throughout its entire area, thereby preventing any contact between the contents of the bottle and the cushion liner which would result in disintegration of the liner. Furthermore, indentation pressures near the edge of the spot, which may occur in the capping machine or in the hoppers of the crowning machine, will not cause the spot to loosen or separate from the liner. The caps produced according to the present invention may also be subjected to sterilization temperatures without affecting the bond between the facing and the cushion liner.

In the accompanying drawing:

Figure 1 is a bottom plan view of a crown cap having a cushion liner and center spot applied thereto;

Figure 2 is a sectional view of the cap of Figure 1, showing the use of a centre spot of paper provided with an impervious coating;

Figure 3 is a sectional view of the cap of Figure 1, showing a metal foil facing;

Figure 4 illustrates a strip or sheet of the facing material having a coating of varnish on its exposed surface and a layer of adhesive on its under surface from which the spot shown in Figure 2 is formed;

Figure 5 is a view of a strip of facing material comprising a layer of metal foil having a coating of adhesive on its under surface from which the spot shown in Figure 3 is formed;

Figure 6 is a plan view of the spot shown in Figure 2, with the layer of varnish and the intermediate layer of paper partially cut away;

Figure 7 is a sectional view of the spot shown in Figure 6;

Figure 8 is a plan view of the spot shown in Figure 3, with a portion of the metal foil cut away; and Figure 9 is a sectional view of the spot shown in Figure 8.

Referring to the drawing, a crown cap is shown comprising a metallic shell 10 having a top 11 and a crimped skirt 12. A cushion liner 13 of natural cork, cork composition, or other suitable material, is adhesively united to the interior of the shell by an appropriate adhesive 10'.

A center spot 14 which, as shown, is of smaller diameter than the cushion liner 13, is attached to the liner by means of a film of adhesive 15. The center spot 14 may be made from the usual spot material such as paper 16, as shown in Figure 2, or a metal foil 17, as shown in Figure 3. Where paper is used as the material of the center spot, it is preferably coated with an impervious layer of varnish 18. Where the spot is made from metal, aluminum or tin foil is preferably used and it is unnecessary to apply a protective coating to its exposed surface. In the manufacture of the center spot closure, a plurality of spots are cut from a laminated strip or sheet of facing material which may comprise a continuous coextensive underlayer 15 of adhesive, an intermediate layer 16 of paper, and a surface layer 18 of varnish, as shown in Figure 4, or it may comprise a strip or sheet of metal foil 17 having a continuous and a coextensive layer of adhesive 15, as shown in Figure 5.

Such a unitary laminated structure may be fed to a suitable punching machine from which the facings are produced and applied to the cushion liner of the cap by heat and pressure, as described in Patent No. 1,788,260, Warth, granted January 6, 1931. The spot which is thus produced from the material shown in Figure 4 is illustrated in Figures 6 and 7 and the spot produced from the material shown in Figure 5 is illustrated in Figures 8 and 9. Cross-sections of the facing material applied to the crown are shown in Figures 2 and 3 which illustrate the unitary character of the closure which is thus produced.

While it is customary to provide spots having a smaller diameter than the cushion liner, as above described, the facing material may be of the same diameter, or coextensive with, the cushion liner. Where paper is used as an element of the facing material, as shown in Figure 4, it may be bleached "kraft" or express paper, and the varnish used for coating the paper may be either an oil varnish solution or a synthetic resin varnish, examples of which are disclosed in the copending application of Albin H. Warth, Serial No. 71,917, filed March 31, 1936.

The adhesive material 15 is preferably made by combining the ethyl ester of shellac with nitrocellulose. This combination may be conveniently effected by the use of a common solvent in which both the ethyl ester of shellac and the nitrocellulose are dissolved. Among the solvents which may be used are ethyl acetate, amyl alcohol, amyl acetate, or ethyl lactate. A satisfactory adhesive of this type may be made by mixing 20 parts by weight of a 50% solution of ethyl ester of shellac in ethyl acetate with 15 parts by weight of a 10% solution of commercial nitrocellulose (preferably 5 seconds) in ethyl acetate. Suitable adhesives have also been made by combining in like manner the ethyl ester of shellac with nitrocellulose in equal parts or in the proportion of two to one.

Another satisfactory adhesive has been made by combining twenty parts, by weight of ethyl ester of shellac with thirty parts of ethyl cellulose, the ingredients being preferably first dissolved in a solvent such as ethyl acetate, as above described.

The solution may be applied to the paper or foil by spreading or spraying and will dry at normal temperatures in a very short time, or the time required for drying may be lessened by drying the coating at a temperature of about 200° F.

The spots, as shown in Figures 6 and 8, may be readily punched from the coated material and are applied to the cushion liner by the usual spotting method. This spotting method, as disclosed in Patent No. 1,788,260, above referred to, involves the use of a heating instumentality, whereby the adhesive is rendered tacky and is pressed into bonded relation with the exposed surface of the cushion liner. Thereupon, the adhesive assumes a firm condition and remains substantially unaffected by any physical changes which occur in the cushion line. The film of adhesive, which is extremely thin, permanently bonds the spot and liner throughout the area of their respective contact surfaces by a continuous protective barrier.

Comparative tests of the adhesiveness of the spot indicate that when an aluminum spot is united to the cushion liner, as above described, it will withstand a pull of between 600 and 700 grams, whereas when adhesives hitherto known were used, the spots were removed with a force equal to about 400 grams.

The superior characteristics of the adhesive, which is used in making the closure of the present invention, are due to the combination of a substance which is normally very tacky and viscous, such as ethyl ester of shellac, with a substance, such as nitrocellulose or ethyl cellulose, having film-forming properties. By "film-forming properties", I mean that the cellulose derivative will cause the ethyl ester of shellac to spread out in the form of an extremely thin film. This property of the cellulose derivative, when combined with substances such as ethyl ester of shellac is very important, since the degree of adhesion is inversely proportional to the thickness of the film.

The combination of nitrocellulose, or ethyl cellulose, with ethyl ester of shellac results in a material which is thermoplastic, i. e., it is characterized by great adhesiveness at high temperatures, and a substantial lack of adhesiveness at low temperatures. In other words, ethyl ester of shellac alone is very tacky even at normal room temperature, but when combined with the cellulose derivative, it is not characterized by tackiness at such temperatures.

The adhesive properties of the combination are due principally to the presence of the ethyl ester of shellac, and this substance also contributes the plastic properties of the combination. That is to say, when nitrocellulose or ethyl cellulose is combined with ethyl ester of shellac, no other plasticizing agent need be added and the material will remain plastic indefinitely.

The ethyl ester of shellac referred to herein is preferably prepared by esterifying bleached white shellac with ethyl alcohol according to the usual esterification processes. Other alkyl esters of shellac may be used, but the ethyl ester is preferred.

Although the preferred film-forming agent in the above described adhesive material is stated to be a cellulose derivative, the latter may be replaced by other film-forming agents such as the vinyl resins, for instance, vinyl acetate. A typical example of this type of compound which I have found to be suitable is one which is sold commercially as "Vinylite 80" solution.

In view of the firm connection between the facing and the liner which is secured by the use of the above described adhesive, the caps may be manufactured and stored without danger of the spots loosening and may be applied to containers, particularly those of the pressure beverage type, with assurance that the facing will not separate from the liner to either weaken the seal or permit the contents to contact with the liner material.

Although the invention has been described in detail, it will be understood that it is not limited to all features set forth in the drawing and in the foregoing description, and that modifications of the several forms described may be made without departing from the invention.

I claim:

In a cap which includes a shell, a cushion liner, a layer of facing material positioned on the latter and a stratum of adhesive interposed between the facing and the liner and uniting the two, said stratum comprising between substantially three and ten parts of ethyl ester of shellac to one part of a compound selected from a group consisting of cellulose esters and vinyl resins.

SCOTT IRA WILBUR.